United States Patent Office 2,731,492
Patented Jan. 17, 1956

2,731,492
PROCESS FOR THE MANUFACTURE OF ACETYLSALICYLIC ACID

Jonas Kamlet, Easton, Conn.

No Drawing. Application April 29, 1954,
Serial No. 426,573

5 Claims. (Cl. 260—480)

This invention relates to a process for the manufacture of acetylsalicylic acid. More particularly, this invention relates to an improved cyclic process whereby acetylsalicylic acid may be manufactured from salicylic acid by the use of the cheap and readily available compound ketene as the effective acetylating agent. It has for its purpose to provide a simplified process for the manufacture of acetylsalicylic acid, from salicylic acid and ketene as raw materials, which will obviate the necessity of distilling or otherwise working up by-product mother liquors to recover reagents and solvent values therefrom, which will greatly diminish the time effectively required to recover the end-product acetylsalicylic acid from the reaction mixture, which will materially improve the overall yields of the end-product and which will materially lower the overall cost of manufacturing acetylsalicylic acid of highest purity.

Acetylsalicylic acid is the most widely used analgesic, antipyretic, antirheumatic and antineuralgic chemotherapeutic agent in human and veterinary medicine. It is commonly known under the non-proprietary name of aspirin, and has been otherwise known throughout the world under a wide variety of proprietary names.

Acetylsalicylic acid has heretofore been manufactured by the acetylation of salicylic acid with acetic anhydride or acetyl chloride, in the presence of an organic diluent (such as glacial acetic acid, benzene, toluene or xylene), at temperatures between 60° C. and 110° C., for reaction periods of 0.5 to 24.0 hours. The reaction may optionally be effected in the presence of a catalyst such as sulfuric acid, alkylsulfonic acid, arylsulfonic acid, phosphorus oxychloride, or a tertiary amine (such as pyridine or dimethylaniline) dissolved in an organic acid. After the acetylation is complete, the reaction mixture is then cooled to a terminal temperature between 3° C. and 25° C., over a period as long as six days, to effect precipitation of the acetylsalicylic acid. The precipitated material is then filtered or centrifuged off, washed with distilled water and then dried in a current of warm air at a temperature of 30°–70° C. (Chemiker Zeitung 51, 748 (1927); German Patent 386,679; Ullmann's Enzyklopaedie der technischen Chemie (2nd edition), vol. 1, pages 163–164; La Nature 2977, 462 (1936); Isihara, Japanese Patent 93,490 (1931); Neustein, U. S. Patent 2,248,112 (1941) Chemical Engineering 60, #6, 116–20 (1953); Manufacturing Chemist, January 1954, p. 16). In each of these processes, a by-product is formed—acetic acid where acetic anhydride is used, hydrochloric acid where acetyl chloride is used as an acetylating agent. This by-product formation involves the necessity of periodically removing at least a portion of the reaction mixture, and then processing (e. g. by distillation and fractionation) this removed portion to recover reagent and solvent values therefrom. Thus, when acetic anhydride is used as an acetylating agent, in the presence of benzene or toluene as a diluent, a portion of the mother liquor is removed after each filtration of precipitated acetylsalicylic acid and is then fractionated to recover the hydrocarbon and the acetic acid. One of the purposes of this invention is to provide a simple cyclic process for the manufacture of acetylsalicylic acid in which the circulating mother liquor need never be processed for recovery of by-product values and the necessity of distillation and fractionation of such liquors is completely obviated, with a corresponding saving in the cost of equipment and plant installations required.

The use of ketene as an acetylating agent in the manufacture of acetylsalicylic acid has been proposed previously. Thus, Nightingale (U. S. Patent 1,604,472 of 1926) and the Ketoid Company (British Patent 237,574 of 1924) have proposed the reaction of ketene with a solution of salicylic acid in diethyl ether to effect formation of acetylsalicylic acid which is poorly soluble in the ether, precipitates out and is filtered off. However, it has been found that the acetylsalicylic acid made by this procedure is excessively contaminated with a co-product consisting of the mixed anhydride of acetic and acetylsalicylic acids, obtained by the reaction of two moles of ketene with one mole of salicylic acid (Hurd and Williams, Journal of the American Chemical Society 58, 962–968 (1936)). The acetylsalicylic acid thus obtained is of poor quality, and fails completely to meet United States Pharmacopeia requirements for physical properties, taste, odor, stability and chemical analysis.

It has been further proposed to prepare such a mixed anhydride of acetic and acetylsalicylic acids (by the reaction of one mole of salicylic acid with two moles of ketene), and to react the said mixed anhydride with additional salicylic acid to obtain acetylsalicylic acid. (Sokol, U. S. Patent 2,423,569 of 1947; Skeldinov, Smirnova and Smolin, U. S. S. R. Patent 66,328 of 1946.) However, the acetylsalicylic acid obtained by this procedure is still of poor quality, excessively contaminated with undesirable co-products and fails to meet the stringent U. S. Pharmacopeia requirements.

The basis of my invention is the finding that ketene will react exclusively and quantitatively with the acetic acid (to form acetic anhydride) in mixtures of acetic acid and acetylsalicylic acid, until such acetic acid has been completely converted to acetic anhydride. Only when no more free acetic acid is present in the mixture will the ketene commence to react with the salicyclic acid to form acetylsalicylic acid and the mixed acetyl acetylsalicylic anhydride.

This finding is made use of to effect a cyclic process for the manufacture of acetylsalicylic acid based on the following sequence of steps:

(a) Salicylic acid is reacted with at least an equimolar amount of acetic anhydride, in the presence of an organic diluent and in the optional presence of a catalyst, at a temperature between 50° C. and 120° C., for a period of time sufficient to cause the acetylation of the salicylic acid to proceed to substantial completion, with the formation of acetylsalicylic acid and acetic acid:

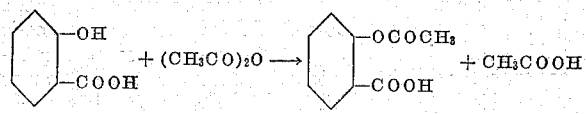

The presence of excess acetic anhydride in this step may serve to accelerate the rate at which the acetylation reaction is effected.

(b) The reaction mixture is then cooled to a terminal temperature between 0° C. and 50° C., and preferably between 0° C. and 25° C., whereby a major portion of the acetylsalicylic acid formed in step (a) precipitates out and is separated from the mother liquor by filtration or centrifuging.

(c) The mother liquor from step (b), comprising a solution of a minor amount of unprecipitated acetylsalicylic acid and free acetic acid formed during the acetylation in step (a) in the organic diluent, is then reacted with ketene, at a temperature between 0° C. and 120° C., and preferably between 0° C. and 30° C., in quantity sufficient to convert at least a major portion of the acetic acid formed in step (a) to acetic anhydride, and preferably in quantity equimolar with the acetic acid formed in step (a) to effect quantitative conversion of said acetic acid to acetic anhydride. The resultant mother liquor comprising a solution of a minor amount of unprecipitated acetylsalicylic acid and acetic anhydride (formed by the reaction of the acetic acid and ketene) is now used to dissolve a further portion of salicylic acid, in quantity equimolar with the acetic anhydride formed. There is thus obtained a reaction mixture containing a minor amount of unprecipitated acetylsalicylic acid, equimolar amounts of salicylic acid and acetic anhydride, the organic diluent and (optionally) the catalyst, if a catalyst is employed in the acetylation. This reaction mixture is then recycled to step (a) of the process, and the cycle is repeated with the formation of additional amounts of acetylsalicylic acid and acetic acid. As previously described, the ketene will react solely with the acetic acid to form acetic anhydride as long as free acetic acid is present, with no tendency to react with the small amounts of acetylsalicylic acid present in the reaction mixture to form the undesirable acetyl acetylsalicylic anhydride.

Ketene is a gas, with a penetrating odor, B. P. minus 56° C., which may be obtained in good yield by the pyrolytic cracking of acetone or acetic acid. (Herriott, Journal of General Physiology, 18, 69 (1934); Hurd, Organic Syntheses 4, 39 (1925); Williams and Hurd, Journ. Org. Chem. 5, 122 (1940); U. S. Patents 2,069,243, 2,080,562, 2,086,582, 2,108,829, 2,045,739, 2,053,286, 1,975,663; British Patents 472,988, 478,303, 410,394, 435,219, 413,709; French Patents 761,731, 777,483; German Patent 598,593; Science 83, 61 (1936); Journ. Amer. Chem. Soc. 56, 1760 (1934).) Ketene will react, over a wide temperature range, with acetic acid to form acetic anhydride in quantitative yield:

$$CH_2=CO+CH_3COOH \rightarrow (CH_3CO)_2O$$

In effecting the cyclic process of this invention, it is desirable to use glass-lined, aluminum or enamelled reactors to obtain a product meeting or surpassing the purity requirements of the United States Pharmacopoeia.

In effecting the first step of the process, the organic diluent is chosen among such products as are chemically non-reactive with acetylsalicylic acid and salicylic acid, in which acetylsalicylic acid and salicylic acid are readily soluble at temperatures of 50° C. to 120° C. and in which acetylsalicylic acid is poorly soluble at temperatures of 0° C. to 50° C. Typical examples of such organic diluents are glacial acetic acid, benzene and the alkylbenzenes (such as toluene, xylene, ethylbenzene, cumene and p-cymene). The preferred diluent is glacial acetic acid. The advantage of using acetic acid as a diluent is obvious. If the reaction mixture in step (c) of my new process is inadvertently treated with an excess of ketene i. e. more than one mole of ketene per mole of acetic acid formed in step (a), such excess of ketene will react with the glacial acetic acid present as diluent, rather than with any unprecipitated acetylsalicylic acid present in the reaction mixture. Thus, the inadvertent or accidental use of excess ketene will merely produce a small excess of acetic anhydride which does not in any way interfere with the proper acetylation of the salicylic acid in step (a) of the process. Such inadvertent or accidental overtreatment with ketene in any one cycle of the process may therefore be compensated by a corresponding undertreatment with ketene in any succeeding cycle, to bring the molar ratio of acetic anhydride-salicylic acid in the reaction mixture in step (a) of the process to unity.

The use of catalysts of the same nature and in the same amounts as have been proposed in the prior art is equally feasible in the process of this invention in order to increase the reaction velocity of the acetylation step. Such catalysts are chiefly chosen from the group consisting of sulfuric acid, the alkylsulfonic acids, the arylsulfonic acids, phosphorus oxychloride and tertiary amines (such as pyridine and dimethylaniline dissolved in glacial acetic acid) and may be employed to the extent of 0.1% to 2.0% on the weight of the salicylic acid being acetylated, although the amount of the catalyst employed is by no means critical and excellent yields may be obtained without the use of any catalysts whatsoever.

The reaction mixture of salicylic acid, acetic anhydride and diluent (with the optional presence of catalyst) is now heated to a temperature between 50° C. and 120° C. for a period of time sufficient to cause substantially complete acetylation of the salicylic acid. The reaction is effected at atmospheric or slightly superatmospheric pressures. The preferred reaction temperature is between 85° C. and 95° C., and the period required for substantially complete acetylation of the salicylic acid may vary from 0.5 hour (with the use of catalysts) to 24.0 hours (without catalysts).

At the conclusion of the acetylation step, the reaction mixture is cooled to effect precipitation and crystallization of the acetylsalicylic acid in the second step of this new process. Thus, if the cooling is effected rapidly, the acetylsalicylic acid is precipitated as small, fine and very regular crystals. If the cooling is effected more slowly, the acetylsalicylic acid is precipitated as larger crystals. The mean crystal size of the end-product may thus be determined and adjusted by the rate of cooling and crystallization of the mother liquor in step (b) of the process. The terminal temperature of the mother liquor at which the precipitated acetylsalicylic acid is filtered or centrifuged off is between 0° C. and 50° C., and preferably between 0° C. and 25° C.

It must be emphasized that, because of the cyclic nature of this process, any acetylsalicylic acid which does not precipitate and/or is not recovered in any one cycle, is retained in the mother liquor, is recycled and then is recovered in a subsequent cycle. Thus, while the recovery of acetylsalicylic acid is only 75% to 90% of theory in the first cycle, succeeding cycles of the process using the recycled mother liquor give yields of acetylsalicylic acid of almost the theoretical.

In the third step of the process, the mother liquor from step (b), (which now contains the minor amount of acetylsalicylic acid not recovered in step (b)), the organic diluent, the free acetic acid formed in step (a) and the catalyst (if one is used) is treated with ketene gas (from a cracking unit of suitable design with a feed of acetone or glacial acetic acid), at any temperature between 0° C. and 120° C., and preferably between 0° C. and 30° C., until one mole of ketene has been absorbed and reacted with each mole of acetic acid formed by the acetylation reaction in step (a) of the process. At the completion of this ketene treatment, the mother liquor is mixed with a quantity of salicylic acid equimolar in amount with the acetic anhydride formed by the reaction of the ketene with the acetic acid. This mixture of equimolar amounts of salicylic acid and acetic anhydride, in a recycling mother liquor containing unprecipitated and/or unrecovered acetylsalicylic acid from the preceding batch, organic diluent and catalyst (if one has been used), is now returned to the first step of the process.

The overall effect of this recycling of reagents is substantially to obtain near-quantitative yields of acetylsalicylic acid from equimolar amounts of salicylic acid and ketene, the reagents being separately introduced into and reacted with the components of the recycling mother liquor in different steps of the cycle.

The following examples are given to define and to illustrate this invention but in no way to limit it to reagents, proportions or conditions described therein. Obvious modifications will occur to any person skilled in the art.

*Example I*

The acetylation is carried on in a double-jacketed enameled cast iron reactor of 6000 liter capacity fitted with a water-cooled reflux condenser, thermometers, automatic temperature register and an efficient agitator. The temperature is regulated by the circulation of steam or cold water through the jacket.

To start the process, a mother liquor is made by dissolving 1021 kgs. of acetic anhydride (10.0 moles) and 4.0 kgs. of 66° Bé. sulfuric acid as a catalyst in a diluent of 1200 kgs. of glacial acetic acid (20.0 moles). To this mother liquor, add 1382 kgs. of salicylic acid (10.0 moles), and raise the temperature of the reaction mixture, with vigorous agitation, in the course of ½ hour to 90°–92° C. Maintain the temperature, with good agitation, at 90°–92° C. for a further period of one hour.

The reaction mixture is now cooled rapidly to a temperature of 15° to 25° C. The acetylsalicylic acid precipitates as small, fine and very regular crystals. The mother liquor is now filtered or centrifuged from the precipitated acetylsalicylic acid and the filter cake is pressed or centrifuged as free of mother liquor as possible. The crystals are washed with distilled water until completely free of acetic acid, pressed or centrifuged as dry as possible and the filter cake is then dried in a current of warm air at a temperature of 60°–70° C.

The yield of acetylsalicylic acid in the first batch only will vary from 1351 kgs. to 1621 kgs. (75%–90% of theoretical), the remaining 10%–25% of acetylsalicylic acid remaining dissolved in the filtrate.

The filtrate from the acetylsalicylic acid precipitate will thus contain 180 kgs. to 451 kgs. of unprecipitated acetylsalicylic acid (1.0 to 2.5 moles), a total of 1800 kgs. of glacial acetic acid (30.0 moles of which 10.0 moles is by-product acetic acid from the previous acetylation reaction and 20.0 moles is the originally added diluent) and 4.0 kgs. of 66° Bé. sulfuric acid catalyst.

Into this filtrate, at a temperature of 15° C. to 25° C., ketene gas is now passed through a sparger tube or diffuser plate, with good agitation. The ketene is generated by the pyrolytic cracking of acetone, and contains only methane as a major by-product of said cracking. The ketene is passed into the well-agitated reaction mixture until a weight increase of 420.5 kgs. of ketene (10.0 moles) has occurred. The reaction mixture will now contain 180–451 kgs. of unprecipitated acetylsalicylic acid (1.0–2.5 moles), 1021 kgs. of acetic anhydride (10.0 moles), 4.0 kgs. of 66° Bé. sulfuric acid catalyst in a diluent of 1200 kgs. of glacial acetic acid (20.0 moles). This mother liquor is recycled to the first step of the process for reaction with another batch of 1382 kgs. of salicylic acid, and so forth.

On recirculating the mother liquor, the yields of pure acetylsalicylic acid, M. P. 135° C. (melt resolidifying at 118° C.) is close to the quantitative, i. e. 1790 to 1800 kgs. per batch. It may also be desirable to add small quantities (e. g. 20 to 50 kgs. of glacial acetic acid) to each batch of mother liquor after the filtration of the precipitated acetylsalicylic acid as "make-up" for the mechanical loss of acetic acid retained in the filter cake. The acetylsalicylic acid is obtained as small, fine, uniform crystals of excellent purity.

*Example II*

A glass-lined reactor of 1500 gallon capacity, fitted with a water-cooled reflux condenser, thermometers with automatic temperature registers and an efficient agitator, is employed.

To start the process, a mother liquor is made by dissolving 1532 kgs. of acetic anhydride (15 moles) in 1200 kgs. of toluene. To this mother liquor, add 1382 kgs. of salicylic acid (10 moles), heat the reaction mixture under an efficient reflux condenser, to 88°–92° C. and maintain within this temperature range for 20 hours.

The reaction mixture is now transferred to aluminum cooling tanks, and is allowed to cool slowly, over a period of 3 to 4 days, to a terminal temperature of 15° C. to 25° C. (room temperature). The acetylsalicylic acid precipitates as large, regular crystals. The mother liquor is now filtered or centrifuged from the precipitated acetylsalicylic acid and the filter cake is pressed or centrifuged as free of mother liquor as possible. The crystals are washed with distilled water until completely free of acetic acid, pressed or centrifuged as dry as possible and the filter cake is then dried in a current of warm air at a temperature of 60°–70° C.

The filtrate from this first batch will comprise a solution of 180 to 270 kgs. of unprecipitated acetylsalicylic acid (1.0 to 1.5 moles), 510 kgs. of acetic anhydride (5.0 moles), 600 kgs. of acetic acid (10.0 moles) (obtained as a by-product in the acetylation step) and 1200 kgs. of the diluent toluene. Into this filtrate, at a temperature of 15° C. to 25° C., ketene gas is now passed through a sparger tube or diffuser plate, with good agitation, until a weight increase of 420.5 kgs. of ketene (10.0 moles) has occurred. The reaction mixture will now contain 180–270 kgs. of unprecipitated acetylsalicylic acid (1.0–1.5 moles), 1532 kgs. of acetic anhydride (15 moles) in 1200 kgs. of toluene. This mother liquor is recycled to the first step of the process for reaction with another batch of 1382 kgs. of salicylic acid, and so forth.

On recirculating the mother liquor, the yields of pure acetylsalicylic acid is close to the quantitative, i. e. 1780 to 1795 kgs. per batch.

The acetylsalicylic acid made by the new process of my invention fully meets and usually surpasses the specifications for this pharmaceutical in the United States Pharmacopeia.

Having described my invention, what I claim and desire to protect by Letters Patent is:

1. A cyclic process for the manufacture of acetylsalicylic acid which comprises the steps of: (*a*) reacting salicylic acid with at least an equimolar amount of acetic anhydride in the presence of an organic diluent, at a temperature between 50° C. and 120° C., for a period of time sufficient to cause substantially complete acetylation of the salicylic acid with the formation of acetylsalicylic acid and acetic acid; (*b*) cooling the reaction mixture to a terminal temperature between 0° C. and 50° C., precipitating a major portion of the acetylsalicylic acid formed in step (*a*) and separating said precipitated acetylsalicylic acid from the mother liquor; (*c*) reacting the mother liquor from step (*b*) containing a minor amount of unrecovered acetylsalicylic acid, free acetic acid formed as a by-product in the acetylation step (*a*) and organic diluent, with ketene in quantity sufficient to convert at least a major portion of said free acetic acid to acetic anhydride, and recycling the resultant mother liquor containing acetic anhydride and organic diluent to step (*a*) of the process for further reaction with salicylic acid.

2. The process of claim 1 wherein the acetylation reaction is effected at a temperature between 85° C. and 95° C.

3. The process of claim 1 wherein the acetylation reaction mixture is cooled to a terminal temperature between 0° C. and 25° C. to effect precipitation of at least a major portion of the acetylsalicylic acid formed.

4. The process of claim 1 wherein the reaction of the acetic acid with ketene to form acetic anhydride is effected at a temperature between 0° C. and 30° C.

5. The process of claim 1 wherein the acetic acid formed as a by-product in the acetylation step (*a*) is reacted with an equimolar amount of ketene.

References Cited in the file of this patent

UNITED STATES PATENTS

| | | |
|---|---|---|
| 671,769 | Lederer | Apr. 9, 1901 |
| 1,604,472 | Nightingale | Oct. 26, 1926 |
| 2,236,125 | Gaylor | Mar. 25, 1941 |
| 2,248,112 | Neustein | July 8, 1941 |
| 2,423,569 | Sokol | July 8, 1947 |